Figure 1:
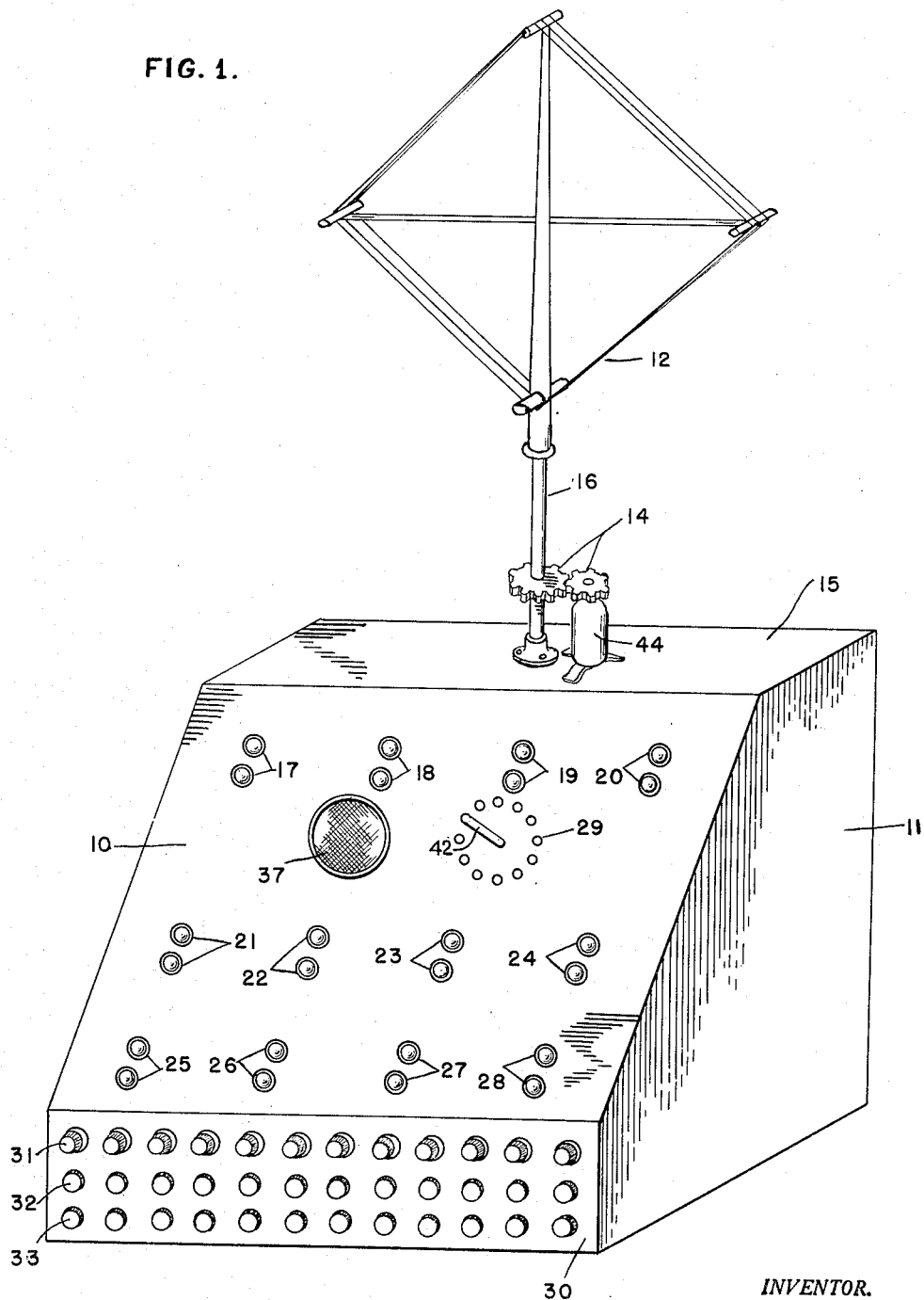

Dec. 29, 1953  D. J. DE LOI  2,664,503
INSTANTANEOUS AUTOMATIC MONITOR
Filed Oct. 16, 1945  2 Sheets-Sheet 1

INVENTOR.
DANIEL J. DE LOI
BY
William D. Hall
Attorney

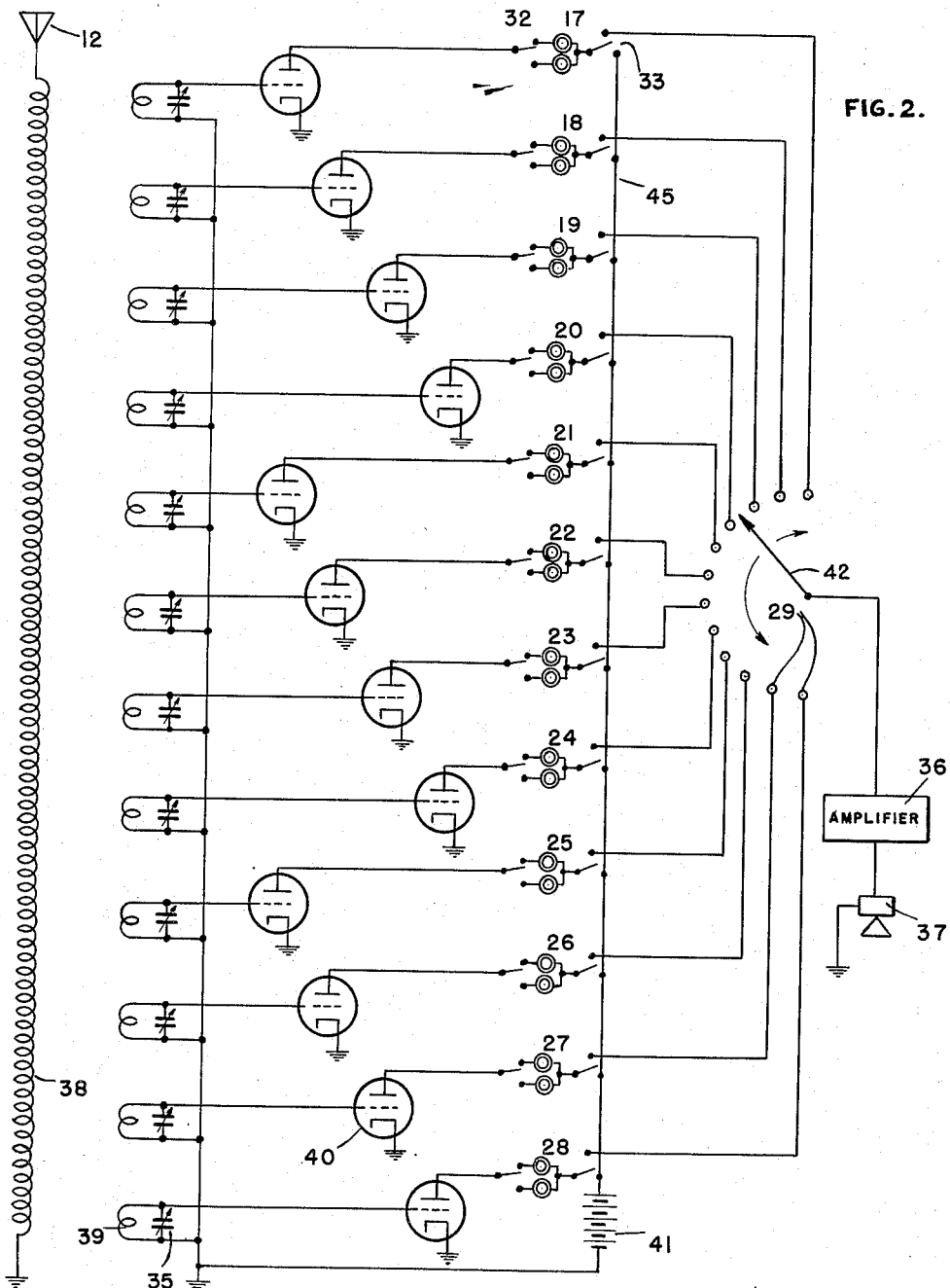

Patented Dec. 29, 1953

2,664,503

UNITED STATES PATENT OFFICE 2,664,503

INSTANTANEOUS AUTOMATIC MONITOR

Daniel J. De Loi, Philadelphia, Pa.

Application October 16, 1945, Serial No. 622,647

1 Claim. (Cl. 250—20)

(Granted under Title 35, U. S. Code (1952), sec. 266)

The invention described herein may be manufactured and used by or for the Government for governmental purposes, without the payment to me of any royalty thereon.

This invention relates to detecting devices and more particularly to electronic monitors for identifying signals from several sources immediately.

In typical systems used for receiving signals electronically, the arrangements are limited in scope to the reception of single signals at a time, and such have to be specifically tuned for through a conventional network. This limitation is not serious for ordinary requirements, but where simultaneous physical indications from all stations in operation at a time are desired, such is not obtainable from such a single system. No means are offered by it for definitely realizing what is going on. The demand for the development of an arrangement that will permit a scouting of the ether waves in an automatic and comprehensive manner has become considerable. Thus the device is of value for determining the activity and obtaining indications of transmissions in a spectrum allocated for emergency and S O S transmissions. This is emphasized in many emergencies, as for instance in the case of a raft station floating aimlessly on the ocean after a wreck where the urgency of rescue is involved; an airplane stranded in a geographical labyrinth; signalling between military stations that cannot be delayed; determining the occasions of weather reporting as they are flashed on the air, and so on for many other active station transmissions sending signals to be picked up appropriately.

It is, therefore, an object of this invention to provide a new and improved electronic monitor that will be able to detect instantaneously the operation of plural electronic stations at various and remote points and be capable of individual selection of one of such stations for specific development of its signals audibly without interruption taking place in the visual detection of the other stations.

For a better understanding of the invention, reference is had to the drawings, which illustrate an example of an embodiment of its features, together with the details outlined in the specifications, while the scope of the invention is particularly pointed out in the claim.

In the drawings:

Figure 1 is a view in perspective of an electronic monitor unit embodying this invention, and Figure 2 is a diagram showing in general the network used with the monitor unit indicated in Figure 1.

Similar reference characters refer to similar parts throughout the drawings.

Referring to the structure shown in Figure 1, the panel 10 is provided with the various operating parts of the monitor unit handled by an operator. The panel 10 is mounted on a suitable cabinet 11 of the form indicated. The cabinet serves as a housing for the general network of the device. A directional antenna 12 is supported on the top side 13 of the cabinet and is continuously revolved by gearing 14 and its central shaft 16 by a motor 44.

On the face of the panel suitable physically appreciable signals, magic eyes or lamps, 17 to 28 inclusive, are mounted and set within suitable frames so as to be flush with the surface thereof. All these lamps have a duplicate or spare lamp connected with them and situated below, as indicated on the panel in Figure 1. A revolving switch 42 is provided on the face of the panel with a series of contacts 29 corresponding with the switching arrangements used in the network, which will be described later. The various lamps are used for various services as marked on the labels over them on the panel. Thus lamps 17 are designated for S O S service; the lamps 18 for Weather service, and so on. The lower front side 30 of the cabinet 11 is provided with two rows of switches, 32 and 33 respectively. The switches 32 each serves to transpose the network from one signal lamp to its spare lamp and vice-versa. The switches 33 serve to transfer the individual lamp circuits from common lamp bus-bar 45 to the contacts of the revolving switch 42 and the audible circuits. Capacitor handles 31 serve to adjustably control the variable capacitors 35 provided in each circuit of the network leading to the various signal lamps mentioned above. The rotating switch serves an amplifying unit 36 which leads to a loudspeaker 37 mounted on the panel, and is energized when one of the switches 33 is turned to the rotating switch circuit.

In Figure 2, the network consists of the aerial or antenna 12, which is connected with a suitable coil or system of coils 38, that is grounded as indicated, and all the circuits for receiving signals. Suitably coupled to the coil 38 are a series of individually tuned circuits 39, 35 each conforming individually with a specific frequency of a remote transmitting station. These particular frequencies are dependent on those transmitted from various extraneous stations that the instrument is intended to keep track of. The capacitors 35 are preferably connected as indicated in the diagram. Tubes 40 of conventional form are connected as indicated in the diagram and are believed to be self-explanatory. 41 is suitable source of potential for supplying the plate potentials.

The operation of the device is as follows:

In the operation of the device, the network is as indicated in Figure 2, with the switches 33 on the contact to bus-bar 45 and the switches 32 closed so as to energize each one of the signal lamps that they are respectively coupled to. The various capacitors 35 are tuned to the particular frequencies which they are individually intended to absorb from a distant station. With the connections so arranged, all the signal lights 17 to 28 inclusive are lit provided all the stations corresponding to their specific circuits are transmitting signals through the air. If any particular station is not transmitting, the corresponding signal light on the panel 10 will not be lit. In such a case, the operator to check up the fact that the lamp itself is not burned out can transfer the switch 32 from the contact of the lamp in circuit to its spare lamp. If a specific station is sought to be examined more closely, the operator turns a specific switch 33 to the rotating switch circuit and moves the arm 42 of the revolving switch 29 until it is on the contact corresponding to the circuit that is to be examined. This places the amplifier into circuit and produces an audible signal in the loudspeaker 37. From the audible signal the operator is able to interpret the message coming from that particular station. Similarly any other station can be examined. During the operation of this device the antenna 12 is revolving under the action of the motor 44 connected to a source of potential and covering all directions so that the signals may be obtained therefrom from any direction.

While there has been described what is at present considered to be a new and improved embodiment of this invention, it will be noted that various changes and modifications may be made thereon without departing from the principles and spirit of the invention, as sought to be defined in the following claim.

I claim:

An electronic monitor unit for detecting plural stations simultaneously, a panel, a plurality of visual signal means mounted on the panel for observance by a user, circuit means connected with said signal means for deriving plural individual signals from predetermined extraneous stations simultaneously, and secondary circuit means for converting the signals into audible responses for each of said stations specifically coordinately with said circuit means, and aerial means for receiving signals and transferring same to said circuits in predetermined relation, means for adjustably controlling said circuit means selectively, a plural rotatable contact switch connected with said circuit means for selectively arranging said circuit means whereby each visual signal may be coordinated through said secondary circuit means to become associated with a controllable audible signal for each station without interfering with the visual indication of signals from other stations, and means for supporting and correlating said panel, means and switch.

DANIEL J. DE LOI.

References Cited in the file of this patent

UNITED STATES PATENTS

| Number | Name | Date |
|---|---|---|
| 1,752,302 | Karsten | Apr. 1, 1930 |
| 2,164,161 | Nekolny | June 27, 1939 |
| 2,412,612 | Godet | Dec. 17, 1946 |